United States Patent [19]

Cosack et al.

[11] 4,136,029
[45] Jan. 23, 1979

[54] PRESSURE FILTRATION DEVICE

[75] Inventors: Klaus Cosack; Wolfgang Hein; Manfred Neumann, all of Dassel, Fed. Rep. of Germany

[73] Assignee: Carl Schleicher & Schull, Einbeck, Fed. Rep. of Germany

[21] Appl. No.: 889,738

[22] Filed: Mar. 24, 1978

[51] Int. Cl.² .............................................. B01D 25/00
[52] U.S. Cl. .......................... 210/242 R; 210/257 M; 210/321 R; 210/416 M; 210/433 M; 210/456
[58] Field of Search ................. 210/23 R, 23 H, 23 F, 210/257 M, 321 R, 321 A, 321 B, 416 M, 500 M, 456, 433 M, 447, 242

[56] References Cited

U.S. PATENT DOCUMENTS

| 3,285,421 | 11/1966 | McKelvey | 210/433 M |
| 3,400,575 | 9/1968 | Madden | 210/433 M |
| 3,556,302 | 1/1971 | Agranat | 210/321 R |
| 3,674,152 | 7/1972 | Manjikian | 210/456 |
| 3,771,663 | 11/1973 | Smith et al. | 210/433 M |

Primary Examiner—Frank Sever
Attorney, Agent, or Firm—Webb, Burden, Robinson & Webb

[57] ABSTRACT

A pressure filtration apparatus including an upper portion with an inflow channel and a discharge channel for the concentrate and a lower portion with a filter support and a discharge channel for the filtrate, the upper and lower portions being releaseably connectable with one another while forming a pressure space. The apparatus contains a distributor plate whose underside is disposed parallel to the upper side of the filter and snugly above the latter while forming an intervening space, and in the center of which is an opening for the concentrate discharge channel. The outer edge of the distributor plate forms a small annular opening which extends all around closely against a basically vertically interior of the pressure space. The top side of the distributor plate has a peripherally raised outer edge which while forming a narrow annular clearance extends to close up against a downwardly pointing horizontal interior wall of the upper portion. The distributor plate has an annular distributor ring surface which grows steadily deeper from the outer edge toward the center of the distributor plate and in the center has a short connecting bushing by way of which the distributor plate is secured to the upper portion and through which the discharge channel for the concentrate runs. The apparatus also includes an inflow channel which opens up in the upper portion in the region of the deepest point of the distributor ring surface above the latter, and at least along a length disposed in front of the opening determining the direction of flow of the emerging inflow current, slopes toward the horizontal at an angle of about 35° to about 55°, preferably about 45°, and relative to the vertical projection of its axis runs basicaly tangentially to the vertical projection of the distributor ring surface.

In preferred embodiments of the invention, the upper portion, lower portion, the distributor plate, the inflow channel, the inflow channel bushing, the filter support, the filtrate discharge channel, and the filtrate discharge bushing may be made of polytetrafluoroethylene (PTFE). If all are made of PTFE, the inflow, the concentrate and the filtrate will be in contact only with PTFE.

12 Claims, 2 Drawing Figures

PRESSURE FILTRATION DEVICE

FIELD OF THE INVENTION

This invention relates to a pressure filtration apparatus of a flat construction suitable for operation in a horizontal position and including means for forcibly conducting the inflow stream over the surface of a filter.

BACKGROUND OF THE INVENTION

Such pressure filtration apparatuses are used in filtration in which membrane filters are employed. Customarily pressure filtration is carried out at operational pressures ranging from about 5 to 15 bars. Such pressure filtration apparatuses may also be used for carrying out reverse osmosis.

Pressure filtration apparatuses of this type should have the maximum possible filtering surface available for the filtration and the smallest possible pressure space. Consequently, they are usually designed as flat, capsule-like, generally round pressure cells. The inflow is usually forced into the pressure space vertically from above and centrally over the filter. When an outlet is provided for the retained material or concentrate, the corresponding discharge channel is usually disposed peripherally.

In this fundamental design of customary flat pressure filtration apparatuses, it is particularly difficult in the case of concentrate reflux to distribute the inflow stream evenly or uniformly over the filter surface without the formation of dead space.

In one known pressure filtration apparatus of the type mentioned above, this problem is solved by means of a channel installed in the shape of a spiral and formed in the upper portion of the pressure filtration apparatus, the said channel being set on the membrane filter. The inflow is delivered in the center of the spiral and is then conducted over the filter surface, along the path defined by the side walls, up to the concentrate outlet on the periphery. The drawback of this apparatus lies in the fact that the inflow which is delivered under pressure impinges vertically directly upon the filter. There is great danger that the filter which frequently consists of only a single membrane might be damaged thereby. Another drawback in the known apparatus is that relative to the diameter of the free or open filter surface only a portion of this surface is available for the filtration. The filter area under the walls of the spiral and behind the outlet of the spiral channel is not available for the through-flow of the filtrate. Moreover, the filter surface that is actually available for the filtration is charged or loaded extremely heavily in an inhomogeneous manner. The inflow impinges on the filter at only a single point on a surface comprising only about one or two percent of the total available filter surface and clogs this area relatively quickly although the filter is still completely free at the discharge point. Therefore, the problem of uniform charging and utilization of the total filter surface has been solved only very incompletely by this so-called Thin-Channel-System.

In view of the existing state of technological development, it is the object of the present invention to create a flat pressure filtration apparatus of the type mentioned which will guarantee a mechanically sparing, uniform, and complete utilization of the total filter surface that is available in the pressure space.

In order to solve this problem a pressure filtration apparatus of the type mentioned at the outset is being proposed which, in accordance with the invention, exhibits the features described and claimed herein.

SUMMARY OF THE INVENTION

The invention provides a flat, essentially two-piece pressure filtration cell in which parallel to the top surface of the filter and closely above the same a distributor plate is disposed which leaves open or free only a narrow intervening space laterally of the side wall of the pressure space and also laterally of the surface of the filter. On its upper side of the distributor plate is dished toward the center similar to a dinner plate or a flat bowl. The distributor plate has an outer edge which serves as the overflow rim and is slightly lower than the mounting bushing which is formed like a hub centrally in the middle of the distributor plate. Thus when the distributor plate is secured firmly to the inner underside of the upper portion of the filtration apparatus, an annular space will also remain free or open between the upper edge of the outer rim of the distributor plate and the lower interior surface of the upper portion of the apparatus. It is crucial that the admission channel for the inflow which is made or provided in the upper portion, such as by boring or in some other manner, generate an inflow current which impinges not perpendicularly on this distributor plate, but rather that it impinges obliquely thereon, that is, basically tangentially to the central mounting bushing of the distributor plate. Then, when the inflow is forced in on the distributor plate, a uniformly distributed flow will be achieved that circulates uniformly and uniformly overflows the plate rim at the outer edges. This inflow stream which uniformly overflows the outer edge of the distributor plate and is acted upon by a tangential flow component passes through the annular space between the side of the distributor plate and the lateral interior wall of the pressure space and arrives in the flat, disk-shaped space between the top surface of the filter and the bottom surface of the distributor plate, the said bottom surface being essentially parallel to the surface of the filter and preferably planar in construction. This bottom surface of the distributor plate may also be dished slightly concavely toward the center.

Thus, with a uniform mass flow the inflow which is uniformly distributed at the outermost filter edge — which is limited by the wall of the pressure space — arrives on the free surface of the filter, still with its tangential flow component. Then freely and evenly distributed, the inflow flows over the total filter surface with a radial and a tangential flow component to the center of the filter surface over which it is forced vertically upwardly from the pressure cell as a concentrate.

As the result of the thusly guided flow, therefore, even with very large filter surfaces, the entire filter surface that is available within the pressure space is utilized completely uniformly and sparingly, making it possible to achieve high rates of throughflow in an extraordinary reliable manner and with long service life. As the result of the tangentially obliquely downwardly directed and basically central delivery of the inflow through the upper portion of the pressure filtration apparatus from above, it is possible, in spite of this distribution principle over the distributor plate, to design the cell just as flat and the pressure space just as small as was the case in the known pressure filtration cells previously described.

According to a further embodiment of the invention, the distributor plate is secured to the upper portion of the apparatus from below by means of a flange-equipped bushing which passes through the said upper portion. On the section projecting on the outer top side of the upper portion, the bushing has an externally threaded portion on which a retaining nut may be secured; the discharge channel for the concentrate is formed in the interior of the bushing. By tightening this nut the distributor plate is secured firmly to the upper portion.

According to another embodiment of the invention, the upper portion and the lower portion of the pressure filtration apparatus are made of polytetrafluoroethylene (PTFE). The upper portion and the lower portion are sandwiched between an upper and a lower steel plate which, when in operating condition, are in turn forced onto one another by means of clamps, vises, or other tensioning means. In this construction, the bushing which secures the distributor plate to the upper portion as well as the distributor plate itself are preferably made of PTFE. Here the retaining nut preferably rests on the exterior top side of the steel plate so that when the nut is tightened, the steel plate, the PTFE upper portion, the distributor plate, and the concentrate discharge channel bushing form a coherent structural entity which can be handled as a unit. For cleaning purposes, this structural entity may be taken apart into its readily cleanable individual parts by releasing this one single screw.

Furthermore, in the PTFE construction, the inflow channel which is likewise disposed in the upper portion and is connected therewith, the inflow channel bushing which passes through the metal plate, the filter support, preferably a frit-like porous plate, the filtrate discharge channel, and the filtrate discharge bushing which passes through the bottom steel plate are likewise all made of PTFE. By this construction it is assured that, aside from the filter which may, however, also be made of PTFE, the inflow, the concentrate, and the filtrate will be in contact exclusively with PTFE.

The invention will now be more fully described below by an exemplifying embodiment with the aid of the accompanying drawings.

BRIEF DESCRIPTION OF A PREFERRED EMBODIMENT OF THE INVENTION

Figure 1:
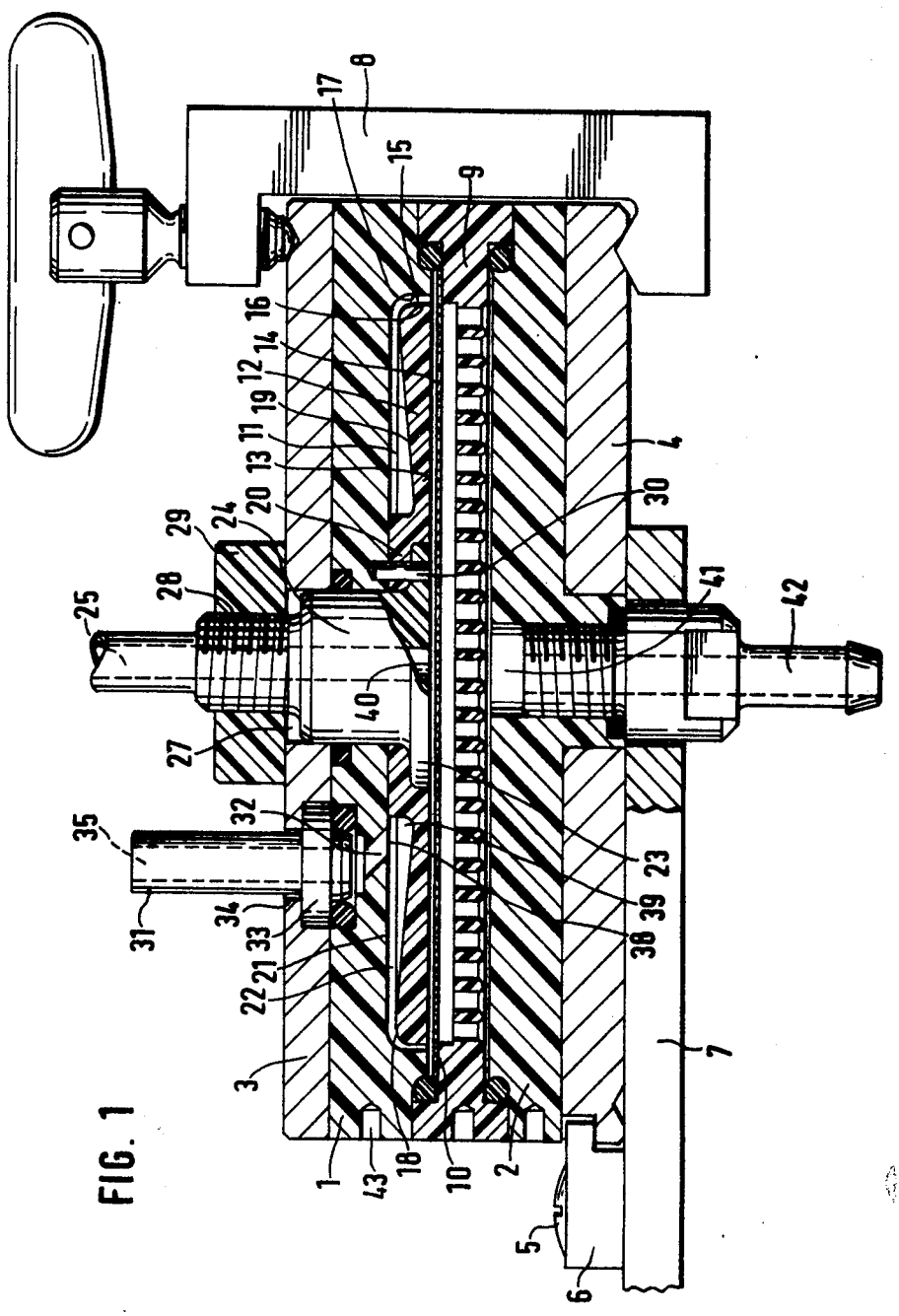
FIG. 1 is a side elevational view of the pressure filtration apparatus, partially in an axial section, and partially broken away.

The exemplifying embodiment of the pressure filtration apparatus shown in FIG. 1 comprises essentially an upper portion 1, a lower portion 2, an upper steel plate 3, and a lower steel plate 4. The pressure filtration apparatus is secured to a horizontal support 7 by means of a screw 5 and a clamp 6. The two steel plates 3 and 4 between which upper portion 1 and lower portion 2 are sandwiched, are forced against one another by means of a number of screw clamps 8 engaging the outer edge, one of the said clamps being shown in FIG. 1.

In the embodiment shown in FIG. 1, a separate intermediate member is shown between the upper portion 1 and the lower portion 2 in the form of a filter support 9 upon which a filter 10 is supported. A pressure space 11 is defined above the filter 10 in the upper portion. Parallel to the top surface of the filter 10 a distributor plate 12 is disposed in pressure space 11. The bottom side 13 of the distributor plate 12 is planar and disposed parallel to the top surface of filter 10. A narrow, disk-shaped intermediate space 14 remains open or free between the top surface of filter 10 and the underside of distributor plate 12. This disk-shaped intermediate space 14 is part of pressure space 11 and is connected to the portion of pressure space 11 that lies above distributor plate 12 by way of an annular space 15 between outer edge 16 of distributor plate 12 and interior wall 17 of upper portion 1.

On its top side distributor plate 12 has a raised outer edge 18 and an annular surface 19, also called the "distributor ring surface", dropping off steadily from the outer edge 18 toward the center of the plate. In the center of distributor plate 12, on its top side, a short hub-like bushing 20 is disposed which reinforces and aligns the distributor plate on downwardly directed interior surface 21 of upper portion 1. This bushing 20 is somewhat higher than the outer edge 18 of distributor plate 12, so that an annular space 22 remains open or free between the upper outer edge 18 of distributor plate 12 and the interior surface 21 of upper portion 1. Here distributor plate 12 is held by a bushing 24 which is provided with an external flange 23. Bushing 24 has a continuous central bore 25 which serves as the concentrate discharge channel. The concentrate discharge channel 25 opens on its underside into disk-shaped intermediate space 14. By means of its lower external flange 23 bushing 24 is so fitted into a corresponding recess in distributor plate 12 that the underside of bushing 24 or its external flange 23 lie precisely aligned in the surface of the underside 13 of distributor plate 12. The shaft of bushing 24 passes through a bore 26 (FIG. 2) in upper portion 1 and through a bore 27 (FIG. 1) in upper steel plate 3, and is provided with external threads 28 on its portion that projects beyond the surface of steel plate 3. Screwed onto threaded portion 28 is a retaining nut 29 whose underside abuts against the top side of upper steel plate 3 and thereby forces bushing 24 with its external flange 23 against underside 21 of upper portion 1, while clamping bushing 20 tight. The distributor plate can be prevented from twisting against the upper portion, for instance by means of a stop pin 30. Preferably a corresponding stop arrangement (not shown) is also disposed between upper portion 1 and upper steel plate 3.

The inflow is forced into pressure space 11 of the pressure filtration apparatus by way of an inflow bushing 31 preferably made of PTFE and an inflow channel 32 bored in upper portion 1. Bushing 31 has an external flange 33 which cooperates with a stop 34 on upper steel plate 3 in such a manner that when the housing is clamped together, bushing 31 is clamped firmly and in a sealing manner between upper steel plate 3 and upper portion 1. Bore 35 of bushing 31 is connected to inflow channel 32.

The inflow channel 32 runs in an oblique downward direction, at an angle of about 35° to 55° and preferably of about 45° to the horizontal or, which is the equivalent thereof, to the plane of filter 10 or the plane defined by the outer edge 18 of distributor plate 12. In the projection onto this plane, central axis 36 of channel 32 lies essentially tangential to the bushing 20 of distributor plate 12 or to the outer edge of distributor plate 12.

Preferably the axis of the inflow channel forms an angle of about 60° to the distributor plate radius which runs through the center-point of upper feed opening 38 of inflow channel 32 in upper portion 1, or forms an angle of about 30° to the secant located at right angles to this radius. Thus, viewed in the direction of flow of the inflow, the inflow channel 32 runs in an oblique downward inward direction and essentially tangentially to bushing 20. Inflow channel 32 has a discharge opening 38 which opens up in the downwardly directed interior top surface 21 of upper portion 1 and is located above the region of the approximately deepest point of distributor ring of annular surface 19, in other words, relatively closely adjacent to the side wall of distributor plate bushing 20.

When the pressure filtration apparatus is in operation, the inflow which is to be treated is forced into the apparatus through bore 35 of inflow bushing 31 and through inflow channel 32. The inflow stream enters pressure space 11 through discharge opening 38. In so doing the inflow stream receives a tangential flow component through channel 32 and impinges on inner edge 39 of distributor plate 12 in an obliquely downward direction. Thereby an essentially circulating-spiral-like flow movement is imparted to the inflow on distributor ring or annular surface 19. With this movement, after the plate depression has been appropriately filled, the inflow overflows the outer edge 18, flows through annular space 22 and annular space 15 into intermediate space 14 above the surface of filter 10. In so doing the inflow still retains its circulating-tangential flow component. The entrance of the inflow into space 14 above the filter surface takes place in a uniformly distributed manner over the entire periphery of filter 10. By the inflow which is continuously being forced in, the fluid which is to be treated and is forced into intermediate space 14 is gradually forced to the center of the filter and from there it is ultimately again forced out in the form of a concentrate out of pressure space 11 of the pressure filtration apparatus through opening 40 of discharge channel 25. The filtrate passing through filter 10 emerges from the pressure filtration apparatus by way of filtrate discharge channel 41 and filtrate discharge bushing 42.

After treatment has been concluded, the lateral clamps may be released and the pressure filtration apparatus may be taken apart into its individual components for the purpose of cleaning same. If the individual parts should be seated too tightly on one another because of the pressure, a spreader tool or a lever may be employed, the gripping lugs for which are disposed in bores 43 at the sides of the upper portion, the lower portion, and the filter support which may possibly be made in several pieces, depending upon the design.

Figure 2:
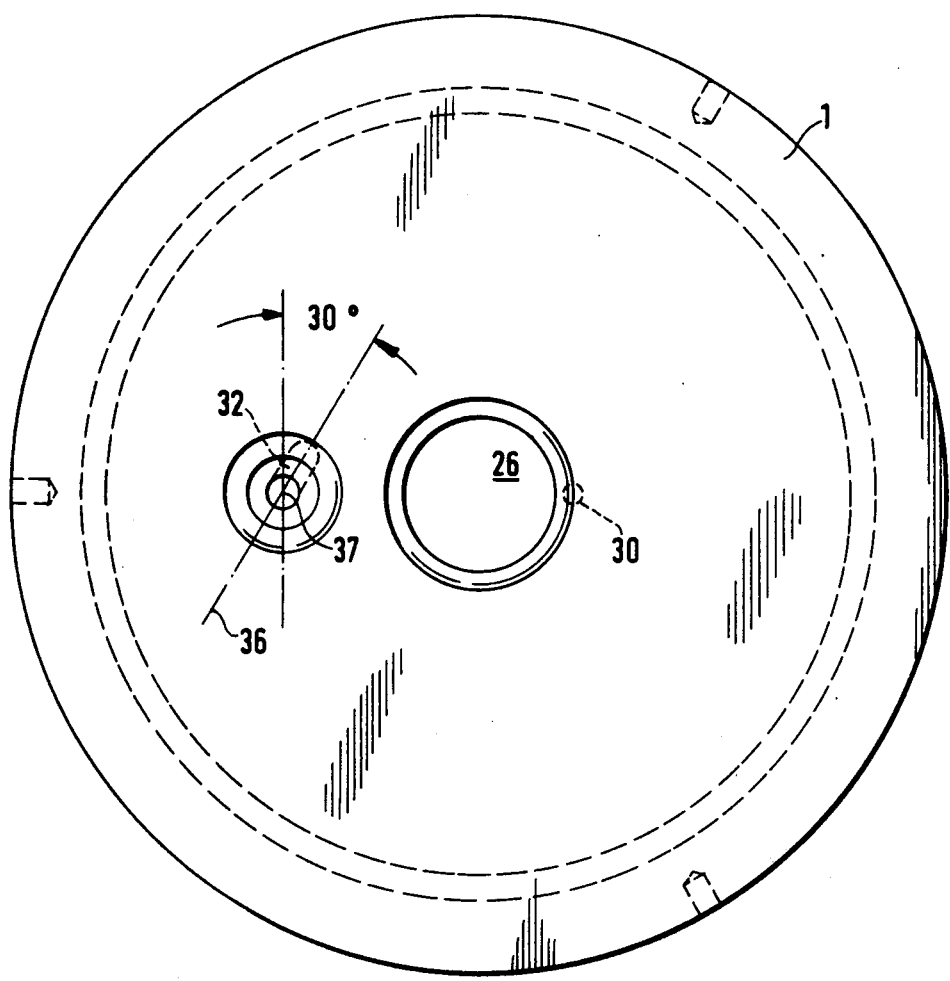
FIG. 2 is a plan view of the upper portion of the pressure filtration apparatus shown in FIG. 1.

In the exemplifying embodiment of the pressure filtration apparatus shown in FIGS. 1 and 2, upper portion 1, filter support 9 which is designed in several pieces as an intermediate member, lower portion 2, distributor plate 12, concentrate discharge channel bushing 24 with adjusting nut 29, inflow bushing 31 and filtrate discharge bushing 42 which is screwed into lower portion 2 in a sealing manner, as well as all of the sealing rings that are used are made of PTFE. Therefore, the inflow, the concentrate, and the filtrate which are treated at a pressure of about 10 bars in the exemplifying embodiment shown in FIGS. 1 and 2 come in contact exclusively with PTFE as the work material in this pressure filtration cell. This is of prime importance in the preparation of highly sensitive liquids, such as pharmaceutical products.

Having described presently preferred embodiments of the invention, it is to be understood that it may be otherwise embodied within the scope of the appended claims.

What is claimed is:

1. In a pressure filtration apparatus of flat construction suitable for operation in a horizontal position and having means for forcibly conducting the inflow stream over the surface of a filter, said apparatus comprising an upper portion with an inflow channel and a discharge channel for the concentrate and a lower portion with a filter support and a discharge channel for the filtrate, the upper portion and the lower portion being releaseably connectable with one another while forming a pressure space, the improvement comprising a distributor plate whose underside is disposed parallel to the upper side of the filter and snugly above the latter while forming an intervening space and in the center of which the concentrate discharge channel opens, the outer edge of the distributor plate forming a small annular space which extends around and closely against a basically vertical interior of the pressure space, the top side of the distributor plate having a peripherally raised outer edge which while forming a narrow annular clearance extends to close up against a downwardly pointing horizontal wall of the upper portion, has an annular distributor ring surface which grows steadily deeper from the outer edge toward the center of the distributor plate and in the center has a short connecting bushing by way of which the distributor plate is secured to the upper portion and through which the discharge channel for the concentrate runs, and an inflow channel having an opening which opens up in the upper portion in the region of the deepest point of the distributor ring surface above the latter and, at least along a length disposed in front of the opening and determining the direction of flow of the emerging inflow current, slopes toward the horizontal at an angle thereto and relative to the vertical projection of its axis runs basically tangentially to the vertical projection of the distributor ring, such that the inflow channel and the distributor plate cooperate to provide an inflow current which impinges basically tangentially to the connecting bushing in the center of the distributor plate.

2. The improvement as set forth in claim 1 wherein the inflow channel slopes toward the horizontal at an angle of about 35° to about 55°.

3. The improvement as set forth in claim 1 wherein the inflow channel slopes toward the horizontal at an angle of about 45°.

4. The improvement as set forth in claim 1 wherein the upper portion and the lower portion are held firmly by clamps between an upper and a lower steel plate.

5. The improvement as set forth in claim 1 wherein the distributor plate is releasably connected to the upper portion by means of a bushing whose bore forms the discharge channel for the concentrate, which at its lower end carries an external flange whose underside lies in the plane of the underside of the distributor plate and whose upper shoulder cooperates with a stop face in the distributor plate bushing and which is provided with external threads on that portion of the bushing which projects above from a bore in the upper portion through which it passes, the said threaded portion cooperating with a nut which connects the bushing and by way of outer flange of the bushing also connects the distributor plate with the upper portion in a sealing manner.

6. The improvement as set forth in claim 5 wherein the bushing for the concentrate discharge channel, the inflow channel including an inflow inlet channel bushing and the filtrate discharge channel including a filtrate discharge channel bushing are also made of polytetrafluoroethylene.

7. The improvement as set forth in claim 1 wherein the upper portion, the lower portion, the distributor plate, and the filter support are made of polytetrafluoroethylene.

8. The improvement as set forth in claim 7 wherein the distributor plate is releaseably connected to the upper portion by means of a bushing whose bore forms the discharge channel for the concentrate, which at its lower end carries an external flange whose underside lies precisely in the plane of the underside of the distributor plate and whose upper shoulder cooperates with a stop face in the distributor plate bushing and which is provided with external threads on that portion of the bushing which projects above from a bore in the upper portion through which it passes, the said threaded portion cooperating with a nut which connects the bushing and by way of the outer flange of the bushing also connects the distributor plate with the upper portion in a sealing manner.

9. The improvement as set forth in claim 8 wherein the bushing for the concentrate discharge channel, the inflow channel including an inflow inlet channel bushing and the filtrate discharge channel including a filtrate discharge channel bushing are also made of polytetrafluoroethylene.

10. The improvement as set forth in claim 7 wherein the upper portion and the lower portion are held firmly by clamps between an upper and a lower steel plate.

11. The improvement as set forth in claim 10 wherein the distributor plate is releaseably connected to the upper portion by means of a bushing whose bore forms the discharge channel for the concentrate, which at its lower end carries an external flange whose underside lies in the plane of the underside of the distributor plate and whose upper shoulder cooperates with a stop face in the distributor plate bushing and which is provided with external threads on that portion of the bushing which projects above from a bore in the upper portion through which it passes, the said threaded portion cooperating with a nut which connects the bushing and by way of the outer flange of the bushing also connects the distributor plate with the upper portion in a sealing manner.

12. The improvement as set forth in claim 11 wherein the bushing for the concentrate discharge channel, the inflow channel including an inflow inlet channel bushing and the filtrate discharge channel including a filtrate discharge channel bushing are also made of polytetrafluoroethylene.

* * * * *

UNITED STATES PATENT AND TRADEMARK OFFICE
CERTIFICATE OF CORRECTION

PATENT NO. : 4,136,029
DATED : January 23, 1979
INVENTOR(S) : Klaus Cosack et al.

It is certified that error appears in the above-identified patent and that said Letters Patent are hereby corrected as shown below:

In the Abstract - Line 13 "vertically" should read --vertical--.

In the Abstract - Line 32 "basicaly" should read --basically--.

Column 2 Line 13 Delete --of--.

Column 2 Line 60 "extraordinary" should read --extraordinarily--.

Claim 1 - Column 6 Line 42 - After "ring" delete the comma and insert --surface,--.

Signed and Sealed this

Seventeenth Day of April 1979

[SEAL]

Attest:

RUTH C. MASON
Attesting Officer

DONALD W. BANNER
Commissioner of Patents and Trademarks